United States Patent [19]

Taylor

[11] 4,297,307

[45] Oct. 27, 1981

[54] PROCESS FOR PRODUCING CARBON-CARBON FIBER COMPOSITES SUITABLE FOR USE AS AIRCRAFT BRAKE DISCS

[75] Inventor: Gordon J. Taylor, Hinckley, Ohio

[73] Assignee: Union Carbide Corporation, New York, N.Y.

[21] Appl. No.: 53,535

[22] Filed: Jun. 29, 1979

[51] Int. Cl.$^3$ .................. B29C 25/00; B29D 3/02
[52] U.S. Cl. .................. 264/29.5; 156/169; 156/184; 264/29.7; 264/108
[58] Field of Search .............. 264/108, 29.1, 29.5, 264/29.3, 29.2, 29.4, 29.7, 103; 427/228; 156/175, 185, 184, 187, 181, 172, 169, 166, 245, 89; 188/251 A; 423/447.2, 448; 428/367, 408; 162/102, 152, 153, 156

[56] References Cited

U.S. PATENT DOCUMENTS

| | | | |
|---|---|---|---|
| 2,842,799 | 7/1958 | Politzer | 264/108 |
| 3,328,501 | 6/1967 | Barnett | 264/108 |
| 3,442,997 | 5/1968 | Parratt | 264/108 |
| 3,462,289 | 8/1969 | Rohl et al. | 264/29.5 |
| 3,552,533 | 1/1971 | Nitz et al. | 264/29.1 |
| 3,617,437 | 11/1971 | Bagg et al. | 264/108 |
| 3,867,491 | 2/1975 | Marin | 264/29.1 |
| 3,936,535 | 2/1976 | Boder | 264/29 |
| 3,970,174 | 7/1976 | Kirkhart | 264/29.5 |
| 3,971,669 | 7/1976 | Wrzesien | 156/148 |
| 4,005,183 | 1/1977 | Singer | 264/29.2 |

FOREIGN PATENT DOCUMENTS 2004855 4/1979 United Kingdom .............. 264/29.5

*Primary Examiner*—Michael W. Ball
*Attorney, Agent, or Firm*—John R. Doherty

[57] ABSTRACT

Carbon-carbon fiber composites suitable for use in aircraft brake discs are made by extruding an aqueous gelled mixture containing chopped carbon fibers and a binder-thickening agent into the form of an elongated ribbon wherein the fibers are aligned in the direction of fluid flow. The ribbon is then arranged into a spiral configuration to form a flat disc shaped article with the fibers oriented in the circumferential direction. The disc shaped article is dried, heated to a sufficiently high temperature to carbonize the binder in the mixture and then impregnated with a liquid carbonaceous binder followed by heating the article to at least a carbonizing temperature in order to densify the product.

16 Claims, No Drawings

PROCESS FOR PRODUCING CARBON-CARBON FIBER COMPOSITES SUITABLE FOR USE AS AIRCRAFT BRAKE DISCS

The present invention relates to carbon-carbon fiber composites of improved strength. More specifically, the invention relates to an improved process for producing carbon-carbon fiber composites for use in aircraft brake discs wherein the individual fibers are oriented in a circumferential direction to attain optimum strength.

Carbon-carbon fiber composites have been produced by bonding carbonaceous fibers together with a binder which, after heating to sufficiently high carbonizing temperatures, leaves a carbon matrix bonding the fibers together. These composites have a high strength-to-weight ratio and are able to withstand higher temperatures (e.g. 800°–3,000° C.) without losing strength. Because of these properties, carbon-carbon fiber composites have found particular application in aircraft brake discs as a structural and frictional material.

In order to attain adequate strength in brake discs, the carbon fibers should be oriented along their length to take advantage of the individual fiber strength. Until now, this fiber orientation has been accomplished by using woven clothes, unidirectional layers or by filament winding.

Chopped fibers are useful in the fabrication of composites because the fiber in short lengths can be easily mixed with conventional carbon binders and compression molded. However, the fibers in these composites are randomly oriented and do not possess the strength of structures where the fibers are aligned in at least one direction such as in woven broadgoods. It is therefore desirable to find a way to align the chopped fibers in one direction in order to impart optimum strength to the composite, i.e., the circumferential direction in the case of brake discs. A major problem encountered in aligning the fibers has been that the fibers are easily degraded in the mixing or extrusion process and this is true even for very high concentrations of binder liquid such as phenolic resin. Another problem has been the tendency for the chopped fibers to gather together in highly concentrated bundles and thus destroy the uniformity of the composite.

It has been found that good fiber flow characteristics can be attained in the extrusion process by adding high concentrations of a powdered filler material to give the resin-fiber combination sufficient body to cause the fiber reinforcement to flow evenly. However, the use of the filler reduces the fiber content of the final fibrous composite and this, in turn, reduces the strength of the composite.

Accordingly, an important object of the present invention is to provide an improved process for producing carbon-carbon fiber composites having a high strength and which are particularly useful in the manufacture of aircraft brake discs.

A more specific object of the present invention is to provide an improved process for producing carbon-carbon fiber composites by extruding a mixture containing short carbon fibers and a binder-thickener which mixture has good fiber flow characteristics for alignment of the fibers.

Another object of the present invention is to provide an improved process for producing carbon-carbon fiber composites by extruding a mixture containing chopped thermoset mesophase pitch fibers which are subsequently carbonized as aligned fibers in the formed composite.

The foregoing objects and other objects and advantages which will become more apparent hereinafter are achieved by the improved process for producing carbon-carbon fiber composites in accordance with the present invention. This improved process is based on the discovery that a mixture of chopped carbon fibers and a binder-thickener material can be extruded with the individual fibers aligned substantially in the direction of fluid flow if a large quantity of water is employed in the mixture together with a thickener which raises the viscosity of the mixture to a gel consistency. It has been found that the aqueous gelled medium imparts a sufficienty body to the mixture to allow the fibers to flow evenly and to orient in the direction of flow without degrading the fibers as they extrude through the nozzle. The extruded ribbon containing the aligned carbon fibers may be laid down on a flat surface in a circular pattern to form a disc. The fibers are oriented circumferentially in the disc for optimum strength.

Carbon fibers as used herein shall mean and include uncarbonized thermoset pitch fibers, carbonized carbon fibers and graphite fibers. A particularly good carbon fiber for use in the practice of the present invention is a chopped thermoset mesophase pitch fiber. These fibers are capable of being converted to high modulus, high strength carbon fibers and are produced from carbonaceous pitches which have been transformed to a liquid crystal or so called "mesophase" state. A detailed description of these fibers as well as processes for their manufacture may be found in U.S. Pat. No. 4,005,183 issued to L.S. Singer on Jan. 25, 1977.

Chopped fibers as used herein shall mean and include short carbon fibers having a length within the range of from about 12 mils up to about 3 inches. A preferred range of fiber length is from about ¼ to about 2 inches. Chopped fibers having a length of about 1 inch are most preferred. Typically, the carbon fibers used in the practice of the present invention have a diameter of about 10 microns.

More specifically, the improved process for producing carbon-carbon fiber composites comprises forming an aqueous gelled mixture containing chopped carbon fibers and water-soluble binder-thickening agent, extruding the gelled mixture into the form of a continuous elongated ribbon wherein the individual carbon fibers are oriented with their lengths in substantial alignment with the direction of flow, arranging the elongated ribbon in a circular pattern to form a flat disc shaped article, drying the article to remove water and then heating the dried article to a sufficiently high temperature to at least carbonize the binder-thickening agent in the mixture. The article is then impregnated with a conventional liquid carbonaceous binder material followed by heating the article to at least carbonizing temperatures to form the finished carbon-carbon fiber composite.

In preparing the aqueous gelled mixture containing the carbon fibers, any material can be used as the thickening agent so long as it is water soluble and capable of thickening the mixture to a gelled consistency having sufficient body to hold the carbon fibers uniformly in alignment with the direction of flow. Generally, the thickener should have a viscosity of at least about 10,000 centipoises at 25° C. Suitable thickeners include polyethylene oxide, ethyl methyl cellulose, hydroxyethyl cellulose, hydroxyethyl methyl cellulose, hydroxypropyl methyl cellulose, methyl cellulose, polyacrylamid, polyvinyl alcohol, polyvinyl methyl ether, starch, gellatin and the like. Polyethylene oxide and hydroxyethyl cellulose are the preferred thickeners. Although either can be employed alone, it has been found that the two thickeners in combination impart excellent flow characteristics to the mixture.

It may be noted that the binder-thickener used in the mixture should have a high carbon residue after carbonization, e.g., 12% coking value in the case of the polyethylene oxide-hydroxyethyl cellulose combination, and provides sufficient fiber bonding strength to allow the composite article to be handled and impregnated without difficulty.

The polyethylene oxide suitable for use in the present invention is water soluble, has a molecular weight of from about 100,000 up to about 5,000,000 and is commercially available from Union Carbide Corporation under the trademark "Polyox". Grade WSR N-3,000 has been found to be especially suitable. This grade has a molecular weight of about 400,000 and a 3 percent aqueous solution of this material has a viscosity of between about 300 centipoises and 500 centiposes at 25° C. while a 5 percent solution has a viscosity of between about 2000 centiposises and 3000 centipoises at 25° C.

The hydroxyethyl cellulose suitable for use in the present invention is likewise water soluble, has a molecular weight of from about 50,000 up to about 1,200,000 and is also commercially available from Union Carbide Corporation under the trademark "Cellosize". This material is really a series of ethers wherein an average of from 0.9 to 1.0 hydroxy radicals on each anydroglucose unit of cellulose have been reacted with ethylene oxide and an average of from 1.8 to 2.0 ethylene oxide molecules have attached to each anhydroglucose unit by reaction with a hydroxy group thereof. Once one ethylene oxide molecule has attached itself at a hydroxyl site, additional ethylene oxide molecules may also attach themselves at the same site in an end to end formation. Alternatively, such molecules may attach themselves at other available hydroxy sites. Grade QP-100 M has a molecular weight of about 1,000,000 and a 0.5 percent solution of this material has a viscosity of between 300 centipoises and 500 centipoises at 25° C. while a 1 percent solution has a viscosity of between about 4000 centipoises and 6000 centipoises at 25° C.

The various proportions of the ingredients used in the gelled mixture will vary depending upon the particular application of the composites. In the case of aircraft brake disc, for instance, the proportions of the ingredients are as follows: chopped carbon fibers between about 5 and 15% by weight; thermal black filler between about 0 and 5% by weight; thickener, e.g., a 50—50% mixture of hydroxythyl cellulose and polyethylene oxide, between about 3 and 10% by weight; the balance of the mixture being water.

Conventional extrusion apparatus may be employed in the practice of the present invention. The only requirement of the apparatus is that it must be capable of extruding the mixture at a fairly fast rate into a continuous elongated ribbon of the desired size and configuration. Typically, a rectangular ribbon is formed in the case of aircraft brake disc.

The extrude ribbon containing the aligned carbon fibers is laid down on a flat surface in a circular pattern to form a disc shaped article. This may conveniently be achieved by placing the extruded ribbon onto a revolving disc platform. The disc platform is continuously rotated while the ribbon is guided to form a spiral or pin-wheel configuration. It will be readily seen that when the ribbon is laid down into this type of configuration, the carbon fibers become aligned in the circumferential direction for optimum strength. Other methods may of course be employed to obtain the circular or spiral pattern such as by forming a disc from a series of progressively smaller diameter rings.

After the extruded ribbon containing the aligned fibers is formed to the desired shape, water is removed by drying at elevated temperatures. The thickeners used in the mixture tend to hold the carbon fibers together in this dried article and provide sufficient strength for handling.

The disc-like article after drying is next heated to a sufficiently high temperature to carbonize the binder-thickener employed in the mixture. Typically, the article may be heated to temperatures of about 300° C. in the case where the mixture contains a precarbonized fiber. If, on the other hand, the fibers that are used in the mixture are uncarbonized, thermoset pitch fibers, the article must be heated to higher temperatures of at least about 800° C. in order to carbonize the fibers as well.

It should be noted in this connection that in the case where uncarbonized thermoset pitch fibers are used instead of precarbonized fibers in the mixture, the present process offers the advantage in that it is possible to combine the carbonization of the pitch pre-cursor fibers and the binder in order to substantially reduce the processing steps while still providing a composite with suitable strength for applications such as aircraft brake disc.

After the binder and if necessary the fibers have been carbonized, the disc shaped article may be densified by impregnating the article with a solution containing a liquid thermosetting resin material. Suitably, a 50% solution of phenolic resin in acetone may be employed for this purpose. After the article has been thoroughly impregnated such as by saturating the article in solution, the composite article is again heated under pressure in a mold to sufficiently high temperatures to carbonize the liquid carbonaceous resin binder and to densify the product. In this step of the process, it is desirable to heat the composite article to temperatures of at least about 800° C. or higher. As a final step, the article may be given a vacuum-pressure impregnation using a high coking value liquid impregnant followed by heating in acarbon particle pack to about 2800° C. Generally speaking, if a high graphitizing temperature is used, the composite will exhibit excellent friction properties for use as a brake disc but it may also exhibit poor wear. On the other hand, if the composite is heated to a temperature of only about 1200° C., the composite will exhibit longer life but its friction properties will be poor. Accordingly, it is preferred to employ temperatures within the range of about 2200°–3000° C.

The present invention will be further illustrated by the following example of the procedure for making aircraft brake discs.

A mixture was prepared having the following proportions: 100 parts by weight chopped thermoset mesophase pitch fibers; 20 parts by weight P-33 thermal black; 50 parts by weight QP 100 hydroxyethyl cellulose; 50 parts by weight WSR-H-3000 polyethylene oxide (Polyox); and 1000 parts by weight water.

These ingredients were thoroughly mixed in a Signa blade mixer to a uniform consistancy. Six-hundred grams of the mixture were placed in an air-powered caulking gun and extruded through a ⅛ inch × ⅜ inch nozzle 3 inches long onto a revolving disc platform to form a 10 inch OD × 4 inch ID fibrous disc. The extruded ribbon of aligned fibers was laid on the revolving disc platform in a spiral configuration with the adjacent ribbons of the spiral in intimate contact with one another. Ten of the aligned fiber discs were dried in an oven 110° C. overnight and then baked to 1800° C. in an inert atmosphere. This operation converted the thermoset fibers to carbon fibers. The carbonized disc was then saturated with a 50% solution of phenolic resin in acetone. The solid resin content of the discs was 48%. The discs were airdried overnight to allow the acetone to evaporate.

The ten resin-impregnated discs were stacked in a steel mold and hot pressed at 500 psi to 600° C. in an induction coil in a nitrogen atmosphere. This operation simultaneously consolidated and bonded the individual discs together and carbonized the phenolic resin binder.

The hot pressed article was further densified by vacuum-pressure impregnating the article with a high coking value liquid impregnant. The impregnated consolidated disc was placed in an induction coil with carbon particle packing and heated to 2800° C. after which the disc was given two more impregnation cycles at 2800° C.

The carbon-carbon fiber composite brake disc was then tested for optimum strength. Table I gives the strength values for the brake disc made in the above example along with the strength values for a brake disc made with the mesophase pitch precursor graphite cloth (8 harness satin weave, 14oz/yd²).

TABLE I

Strength Properties of Aligned Chopped Fiber Composite Compared with Cloth Laminate Composite

|  |  | Aligned Fibers | Cloth Laminate |
|---|---|---|---|
| Flexural Strength | MPa* | 136.0 | 113.5 |
| Tensile Strength | MPa | 79.3 | 73.7 |
| Sonic Modulus | GPa | 94.6 | 82.3 |

*SI units

What is claimed is:

1. A process for producing carbon-carbon fiber composites of high strength which comprises forming an aqueous gelled mixture containing between about 5 and 15% by weight chopped carbonaceous fibers and a water-soluble binder-thickening agent selected from the group consisting of polyethylene oxide, ethyl methyl cellulose, hydroxyethyl cellulose, hydroxyethyl methyl cellulose, hydroxyproply methyl cellulose, methyl cellulose, polyacrylamid, polyvinyl alcohol, polyvinyl methyl ether, starch and gelatin, said binder-thickening agent having a viscosity of at least about 10,000 centipoises at 25° C., extruding the gelled mixture into the form of a continuous elongated ribbon wherein the individual carbon fibers are aligned substantially in the direction of fluid flow, arranging said elongated ribbon in a spiral pattern to form a flat disc shaped article, drying said article to remove water, heating the dried article to a temperature of at least about 300° C. and then impregnating said article with a liquid thermosetting resin binder followed by heating said article under pressure in a mold to a temperature of at least about 1200° C.

2. A process for producing carbon-carbon fiber composites of high strength which comprises forming an aqueous gelled mixture containing between about 5 and 15% by weight chopped carbonaceous fibers and a water-soluble binder-thickening agent selected from the group consisting of polyethylene oxide, ethyl methyl cellulose, hydroxyethyl cellulose, hydroxyethyl methyl cellulose, hydroxypropyl methyl cellulose, methyl cellulose, polyacrylamid, polyvinyl alcohol, polyvinyl methyl ether, starch and gelatin, said binder-thickening agent having a viscosity of at least about 10,000 centipoises at 25° C., extruding the gelled mixture into the form of a continuous elongated ribbon wherein the individual carbon fibers are aligned substantially in the direction of fluid flow, arranging said elongated ribbon in a circular pattern to form a flat disc shaped article, drying said article to remove water, heating the dried article to a sufficiently high temperature to at least carbonize the binder in said mixture and then impregnating said article with a liquid carbonaceous binder material followed by heating said article under pressure in a mold to at least carbonizing temperatures in order to densify the article.

3. A process as defined by claim 2 wherein said chopped carbonaceous fibers have a length within the range of from about 12 mils to about 3 inches.

4. A process as defined by claim 3 wherein said chopped carbonaceous fibers have a length within the range of from about ¼ to about 2 inches.

5. A process as defined by claim 4 wherein said chopped carbonaceous fibers have a length of about 1 inch and a diameter of 10 microns.

6. A process as defined by claim 3 wherein said chopped carbonaceous fibers are selected from the group consisting of carbonized carbon fibers, uncarbonized thermoset pitch fibers and graphite fibers.

7. A process as defined by claim 6 wherein said chopped carbonaceous fibers are uncarbonized thermoset mesophase pitch fibers.

8. A process as defined by claim 6 wherein said dried article is heated to temperatures of at least about 300° C. when said mixture contains carbonized fibers.

9. A process as defined by claim 6 wherein said dried article is heated to temperatures of at least about 800° C. when said mixture contains uncarbonized, thermoset pitch fibers.

10. A processs as defined by claim 2 wherein said elongated ribbon is guided onto a rotating disc platform in a spiral pattern to form said flat disc shaped article.

11. A process as defined by claim 2 wherein said carbonaceous binder material is a liquid thermosetting resin.

12. A process as defined by claim 11 wherein said liquid thermosetting resin is a 50% solution of phenolic resin in acetone.

13. A process as defined by claim 2 wherein said article after impregnation is heated to temperatures of at least about 1200° C.

14. A process as defined by claim 2 wherein said article after heating to carbonizing temperatures is impregnated using a high coking value liquid impregnant followed by heating in an inert atmosphere to temperatures within the range of from about 2200° C. to about 3000° C.

15. A process for producing carbon-carbon fiber composites of high strength which comprises forming an aqueous gelled mixture containing between about 5 and 15% by weight chopped, uncarbonized, thermoset pitch fibers and a water-soluble binder-thickening agent selected from the group consisting of polyethylene oxide, ethyl methyl cellulose, hydroxyethyl celluolose, hydroxyethy methyl cellulose, hydroxypropyl methyl cellulose, methyl cellulose, polyacrylamid, polyvinyl alcohol, polyvinyl methyl ether, starch, and gelatin, said binder-thickening agent having a viscosity of at least about 10,000 centipoises at 25° C., extruding the gelled mixture into the form of a continuous elongated ribbon wherein the individual carbon fibers are aligned substantially in the direction of fluid flow, arranging said elongated ribbon in a circular pattern to from a flat disc shaped article, drying said article to remove water, heating the dried article to a temperature of at least about 800° C. and then impregnating said article with a liquid thermosetting resin binder followed by heating said article under pressure in a mold to a temperature of at least about 1200° C.

16. A process for producing carbon-carbon fiber composites of high strength which comprises forming an aqueous gelled mixture containing between about 5 and 15% by weight chopped carbonaceous fibers, between about 0 and 5% by weight thermal black, and between about 3 and 10% by weight of a water-soluble binder-thickening agent composed of a mixture of polyethylene oxide and hydroxyethyl cellulose, said binder-thickening agent having a viscosity of at least about 10,000 centipoises at 25° C., extruding the gelled mixture into the form of a continuous elongated ribbon wherein the individual carbon fibers are aligned substantially in the direction of fluid flow, arranging said elongated ribbon in a circular pattern to form a flat disc shaped article, drying said article to remove water, heating the dried article to a sufficiently high temperature to at least carbonize the binder in said mixture and then impregnating said article with a liquid carbonaceous binder material followed by heating said article under pressure in a mold to at least carbonizing temperatures in order to densify the article.

* * * * *